Oct. 20, 1925.
H. GUNDERSON
WASTE AND DRAIN PIPE CLEANER
Filed Oct. 17, 1924
1,558,161
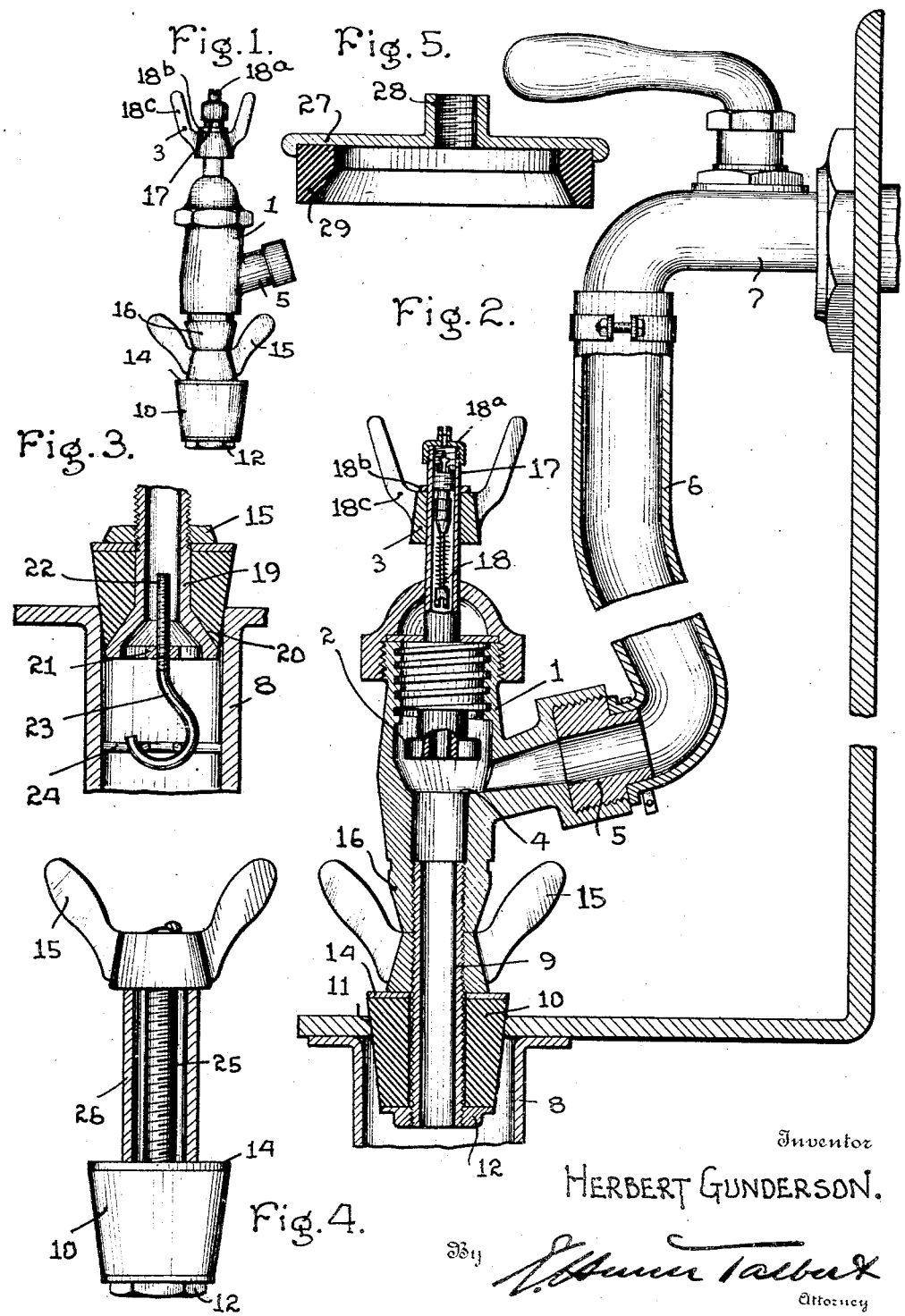
Inventor
HERBERT GUNDERSON.

Patented Oct. 20, 1925.

1,558,161

UNITED STATES PATENT OFFICE.

HERBERT GUNDERSON, OF STANLEY, WISCONSIN

WASTE AND DRAIN PIPE CLEANER.

Application filed October 17, 1924. Serial No. 744,297.

*To all whom it may concern:*

Be it known that I, HERBERT GUNDERSON, a citizen of the United States, residing at Stanley, in the county of Chippewa and State of Wisconsin, have invented new and useful Improvements in Waste and Drain Pipe Cleaners, of which the following is a specification.

The purpose of the invention is to provide a device for cleaning waste and drain pipes and the like wherein the pressure of the water system may be directly applied to such waste or drain pipe to force out any obstruction, and to provide means directly at the device by which the water supply may be cut off when desired; and further to provide means, when the water pressure is insufficient to remove the obstruction, to apply air with a force pump to secure adequate pressure.

A further object is to provide a plug or stopper in connection with which the device is used and which may be securely anchored in the waste or drain pipe to be cleaned.

With these objects in view, the invention consists in the construction and combination of parts of which a preferred embodiment is illustrated in the accompanying drawings, wherein:

Figure 1 is a side elevational view of the device.

Figure 2 is a central vertical sectional view through the device and showing it in operative position with relation to a water system and the waste pipe of a sink.

Figure 3 is a detail sectional view showing the manner of anchoring the stopper or plug to the guard in the waste pipe.

Figure 4 is a detail sectional view showing a modification wherein the stopper or plug must be at a greater distance from the cleaner than is ordinarily the case, so that the plug may be inserted deep into the waste pipe.

Figure 5 is a diametrical sectional view of a disk member designed to be employed when the device is used to clean waste pipes in which the mouth is of a diameter too large for the plug.

Essentially, the invention comprises a valve housing or casing 1 enclosing the valve or compression cock 2 operable by means of a handle 3 to raise it or lower it into engagement with the valve seat 4. The casing is provided with a lateral inlet leg 5 by means of which water from the system may be admitted to the valve casing through a flexible conductor or hose 6 which is attached to the spigot 7, as shown.

The inlet leg 5 communicates with the valve casing above the plane of the seat 4 and therefore when the valve is closed, the water supply is shut off at this point. When the valve is opened, however, the water is admitted to the waste pipe 8 through a tubular stem 9 upon which the resilient plug 10 is carried, the latter being seated in and frictionally held in engagement with the inlet 11 of the waste pipe. The tubular stem 9 is headed at its lower end, as indicated at 12, such head being preferably in the form of a washer threadingly engaged with the stem and receiving the thrust of the lower end of the plug 10 which is of conical form. On top of the plug, a washer 14 is seated and a wing nut 15 is engaged with the stem and bears upon the washer, thus securing the plug in place on the stem, and the latter is connected with the valve casing by threaded engagement with the discharge leg 16 thereof.

When the pressure from the supply system is insufficient to remove the obstruction from the waste pipe, the valve 2 is closed. By this operation, water will have been trapped in the waste pipe, however, between the obstruction and the valve casing. Air pressure may then be directly applied on the water in the waste pipe by means of an appropriate air pump connected with the threaded extremity 17 of the valve stem which is axially bored to provide an air duct and in which is contained the spring seated inwardly opening air valve 18, such as is employed on pneumatic tires for vehicles and the like. The valve being inwardly opening, it is impossible for water to escape through the valve stem when the air pump is not in use. The valve stem is closed at the upper end when not in use by a cap 18ª and the nut 18ᵇ which is threadingly engaged with the stem serves to retain the valve operating handle 18ᶜ in position on the stem.

It sometimes becomes necessary to anchor the plug or stopper 10 in the mouth of the waste pipe and to this end the construction is modified by forming the tubular stem as indicated at 19 in Figure 3 with a flaring lower end or mouth 20 which is spanned by a spider 21 tapped at the center for the engagement of the threaded shank 22 of a hook member 23. In attaching the modified form shown in Figure 3, the stem is extended as far as necessary beyond the spider to permit the hook to engage the guard 24, whereupon the plug is rotated and is in this manner drawn into the mouth of the waste pipe or line by the tubular stem 19 being advanced on the threaded stem of the hook.

Where it becomes necessary for the stopper to be inserted a considerable depth in the waste pipe, a relatively long stem 25, such as shown in Figure 4, is employed, and in order that the stopper may be firmly held in place thereon, the stem is enclosed by a sleeve 26 on the upper end of which the wing nut 15 engages, forcing the sleeve into engagement with the washer 14 to lock the plug at the lower end of the stem, as in the construction shown in Figures 1 and 2.

Where the waste pipe is of a diameter too large to permit the insertion and frictional engagement of the plug, a disk member 27, such as shown in Figure 5, is employed, this disk member having a threaded hub 28 for the reception of the tubular stem 9 and carrying on its under face an annular compressible gasket 29. The disk member is either held in contact with the surface bounding the inlet to the waste pipe by adequate pressure or clamped into engagement therewith in the manner shown in Figure 3. Therefore, irrespective of the diameter of the waste pipe, the pressure on the water main may be thereby conveyed to the waste pipe.

The invention having been described, what is claimed as new and useful is:

A waste and drain pipe cleaner comprising a casing provided with a plug member for insertion in the mouths of waste pipes and the like, said casing having a water inlet leg operatively connected to a hydrant spigot for the admission of water under pressure, said casing having a valve seat on a level with the bottom of a passage through the inlet leg, control means comprising a valve cooperative with the seat for trapping a column of water between the obstruction in said waste pipe and the control valve, said valve having a hollow stem with operative threaded connections in the casing to hold the valve against its seat, the stem of the valve having a vertical passage for air under pressure, said valve stem having means at its upper end adapted for the operative connection of a tube from a pneumatic pump for forcing air under pressure through the casing at a point below the valve seat while the valve is closed, causing the removal of the obstruction and the trapped column of water, and a check valve mounted in the stem of the first valve to admit air under pressure and to prevent the back-flow of the trapped column of water.

In testimony whereof he affixes his signature.

HERBERT GUNDERSON.